United States Patent [19]

Heisner

[11] 4,229,128
[45] Oct. 21, 1980

[54] REINSERTABLE ADJUSTABLE BORING BAR

[75] Inventor: Marvin M. Heisner, Howell, Mich.

[73] Assignee: Fansteel Inc., North Chicago, Ill.

[21] Appl. No.: 34,446

[22] Filed: Apr. 30, 1979

[51] Int. Cl.³ .............................................. B23B 51/00
[52] U.S. Cl. .................................... 408/185; 408/197; 408/226; 407/37
[58] Field of Search ............... 408/185, 181, 197, 198, 408/226, 232, 233, 238, 240; 407/37, 45, 77

[56] References Cited

U.S. PATENT DOCUMENTS

| 2,438,607 | 3/1948 | Jackson | 408/181 |
| 3,486,401 | 12/1969 | Kelm | 408/181 |
| 3,516,134 | 6/1970 | Heuser | 407/37 |

FOREIGN PATENT DOCUMENTS

| 313616 | 6/1956 | Switzerland | 408/185 |
| 302177 | 4/1971 | U.S.S.R. | 408/181 |

*Primary Examiner*—Leonidas Vlachos
*Attorney, Agent, or Firm*—Barnes, Kisselle, Raisch & Choate

[57] ABSTRACT

An adjustable boring bar with a boring head which can be locked, released, readily adjusted radially, removed from the basic bar, replaced in the same position of adjustment and relocked. The boring bar has a self-contained locking device and adjustable index block which cooperate to permit quick disassembly and replacement.

2 Claims, 7 Drawing Figures

U.S. Patent
Oct. 21, 1980
4,229,128
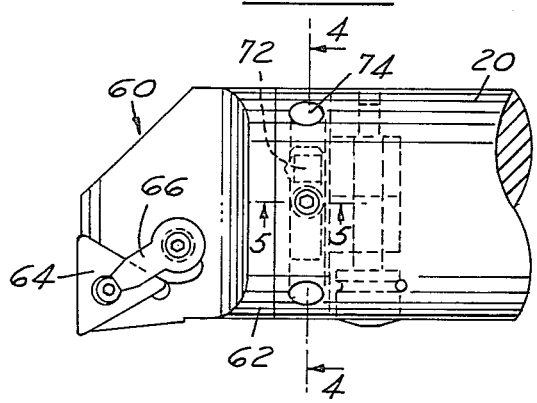
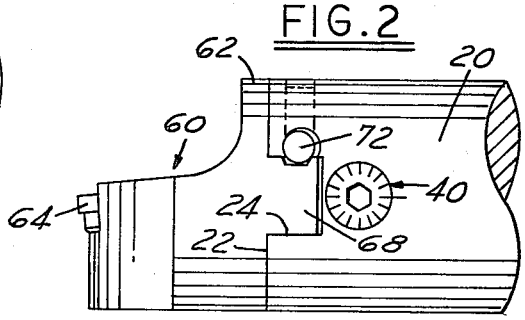
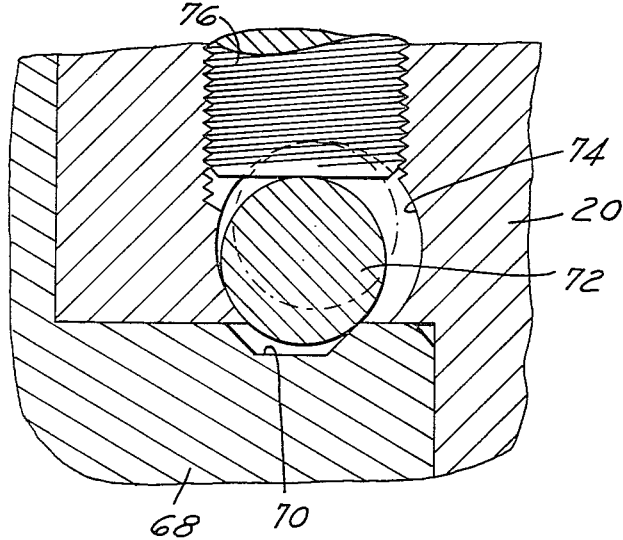
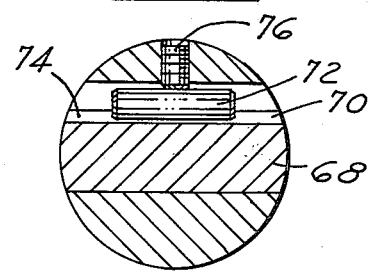
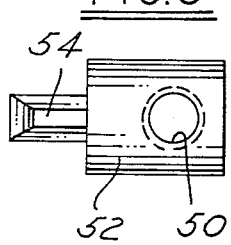
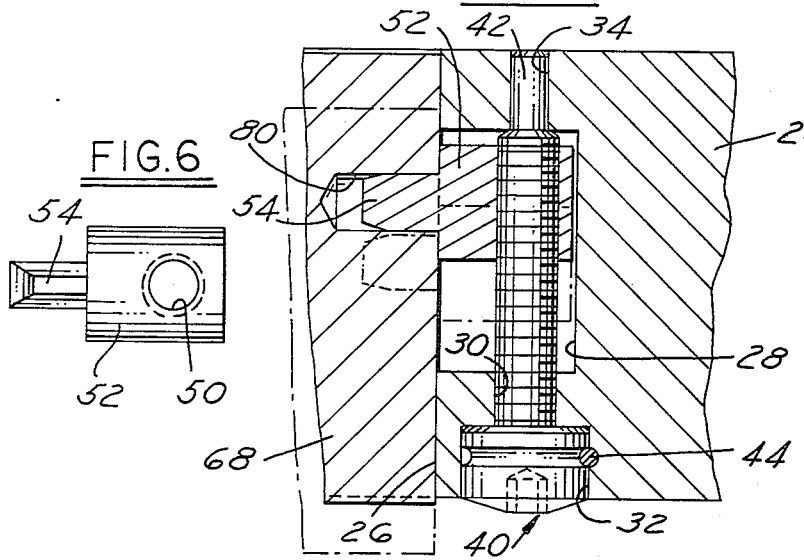
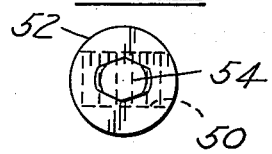

REINSERTABLE ADJUSTABLE BORING BAR

FIELD OF INVENTION

Adjustable head boring bars for metal cutting.

BACKGROUND OF INVENTION

Adjustable boring bars are common in the art with radial adjustments being possible in various ways. With the advent of tape controlled machines and automation equipment, it has become extremely important to be able to change tooling rapidly without changing the intended dimension. Many tools are single purpose tools in a single location in a machine. Thus, when a tool point wears or breaks, it must be replaced quickly to avoid a long shut down of the machine.

Thus, it is an object to provide a boring bar and head which is simple in construction with a minimum of parts which can be readily disassembled and replaced with accurate relocation. The present invention is intended to be an improvement on the disclosure in U.S. Pat. Nos. to Kelm 3,486,401 (1969) and Heuser 3,516,134 (1970) in the reduction of the parts required, the ease of machining, the interchangeability of the boring heads, and the locking means for the head.

Other objects and features of the invention will be apparent in the following description and claims in which the principles of the invention are set forth together with details to enable tool makers to construct and use the invention, all in connection with the best mode presently contemplated for the practice of the invention.

BRIEF DESCRIPTION OF THE DRAWINGS

DRAWINGS accompany the disclosure and the various views thereof may be briefly described as:

FIG. 1, an assembly plan view of a boring bar constructed in accordance with the present invention.

FIG. 2, a side view of the assembly.

FIG. 3, a sectional view showing the micrometer adjustment.

FIG. 4, a sectional view on line 4—4 of FIG. 1.

FIG. 5, an enlarged sectional view on line 5—5 of FIG. 1.

FIG. 6, a side elevation of an index block.

FIG. 7, an end view of the index block.

DETAILED DESCRIPTION

With reference to the drawings, a circular boring bar 20 has a flat end 22 which is provided with a diametrical recess 24 with chordal sides and a flat base or bottom wall 26. In the bottom wall 26 of the recess 24 is a second sub-recess or well 28 shorter in length but parallel to recess 24. At the lower end of recess 28, as viewed in FIG. 3, is a hole 30 which enlarges into a counterbore 32. At the upper end of recess 28, as viewed in FIG. 3, is a pilot hole 34. A micro-screw 40 has a grooved head to fit in the counterbore with a threaded shank to rotate in hole 30 and a pilot end 42 to rotate in pilot hole 34. A pin 44 accurately locates the screw head. The threaded shank of screw 40 threads into a tapped recess 50 of an index block 52 which has a sliding fit in sub-recess 28. The index block has a projection 54 having a pseudo-hexagonal shape (FIGS. 6 and 7).

Thus, it will be seen that rotation of the screw 40 will cause the block 52 to traverse the diagonal sub-recess 28.

The boring head 60 of the boring bar has a cylindrical base 62 and a cut-away portion which provides a surface for the mounting of an indexable, replaceable insert 64 retained by a screw clamp 66. The base of the head 60 is flat except for a diagonal rib 68 which has a sliding fit with the diametrical recess 24.

One wall of the rib 68 has a groove 70 with angled walls which cooperate with a dowel pin 72 in an elongate recess 74 of boring bar 20. A set screw 76 is positioned in boring bar 20 perpendicular to dowel pin 72. Moving set screw 76 in will force the dowel pin 72 into groove 70 to force the rib 68 inwardly and bring the base of head 60 into tight contact with surface 26 of bar 20.

Boring head rib 68 also has a bore 80 which has a tight slip fit with the projection 54 on index block 52.

Thus, as illustrated in FIG. 3, the assembly is such that micro-screw 40 can be turned to adjust the diametrical position of boring head 60 and the relationship of the cutting tip of insert 64 relative to the axis of rotation of boring bar 20. Releasing the screw pressure of screw 76 takes the pressure of dowel pin 72 off the rib 68 to allow adjustment (FIGS. 4 and 5).

Assuming the boring head is properly adjusted and the cutting insert 64 becomes dull or breaks, the pin 72 may be released and the entire head pulled axially away from the bar 20. When the insert is indexed or replaced, the head may be re-installed on the projection 54, the screw 76 moved to clamping position against dowel pin 72 and the boring bar put into service.

What I claim is:

1. An adjustable boring bar combination comprising:
   (a) an elongate bar having an axis of rotation and a first recess in the working end of said bar extending transversely to said axis across said bar with parallel side walls lying in planes parallel to said axis of rotation, and a second transverse recess formed as a well in the bottom of said first recess and closed at each end,
   (b) an adjustment screw having a threaded shank with each end mounted for rotation in said bar at the respective ends of said second recess and axially retained in said bar,
   (c) an index block slidably positioned in said well and having a projection extending into said first recess and having a tapped hole to receive said threaded shank of said adjustment screw,
   (d) a boring head having a rib with parallel side walls to fit slidably in said first recess and a hole on said rib to receive said projection on said index block, and
   (e) means to retain said rib in said first recess comprising a lock pin in a transverse hole aligned with said first recess and communicating therewith through an opening in a wall of said first recess, and a pressure screw to move said pin laterally against one side of said rib of said boring head.

2. A boring bar combination as defined in claim 1 in which said one side of said rib has a groove formed therein with an angled side to cooperate with said pin to lock said rib in said first recess.

* * * * *